Dec. 18, 1956   S. KLEMP ET AL   2,774,565
VALVE FOR GAS WATER HEATERS
Filed March 13, 1951   3 Sheets-Sheet 1

INVENTOR
Siegfried Klemp
Hans Hünges

Dec. 18, 1956 S. KLEMP ET AL 2,774,565
VALVE FOR GAS WATER HEATERS
Filed March 13, 1951 3 Sheets-Sheet 2
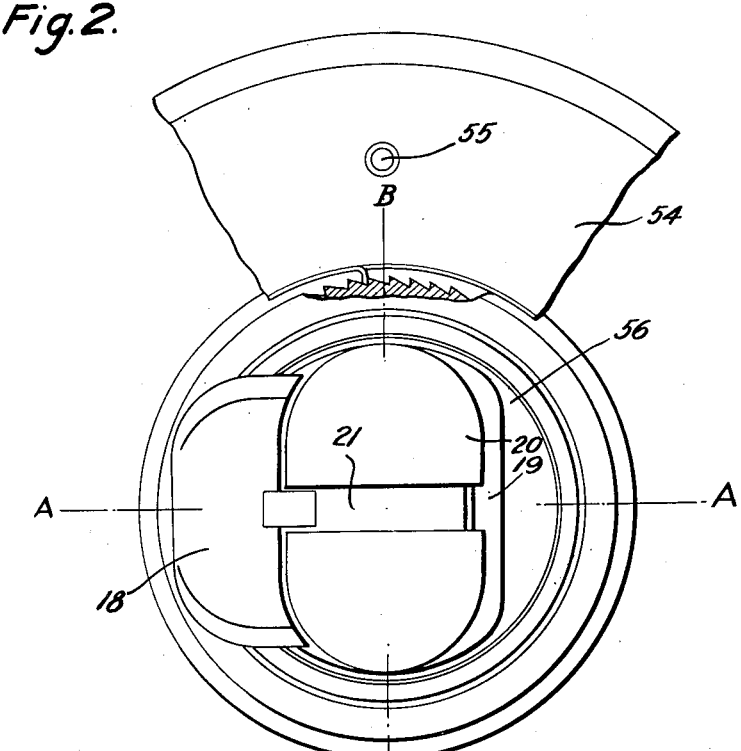
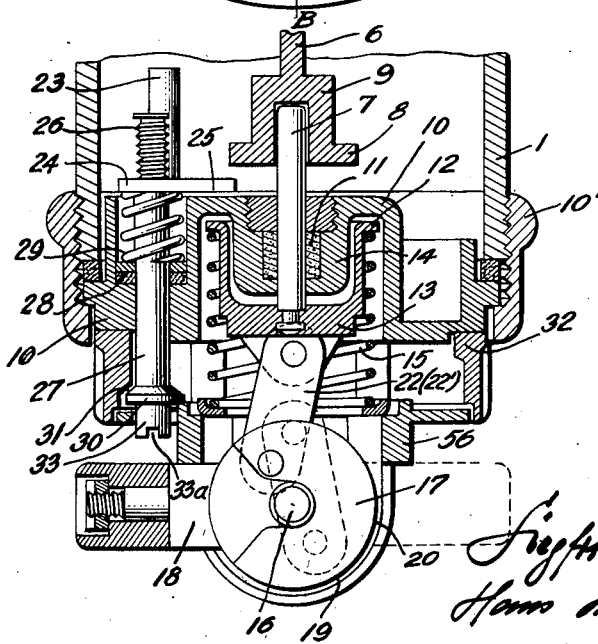
INVENTOR

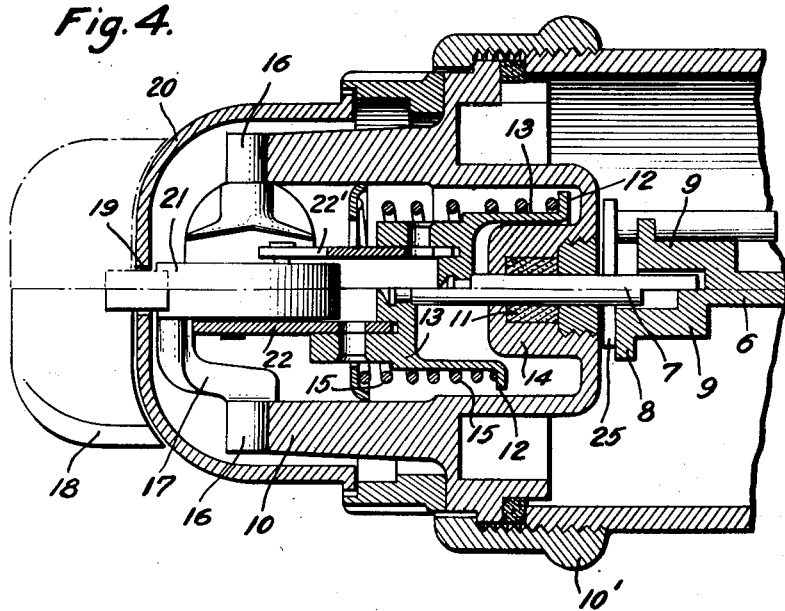
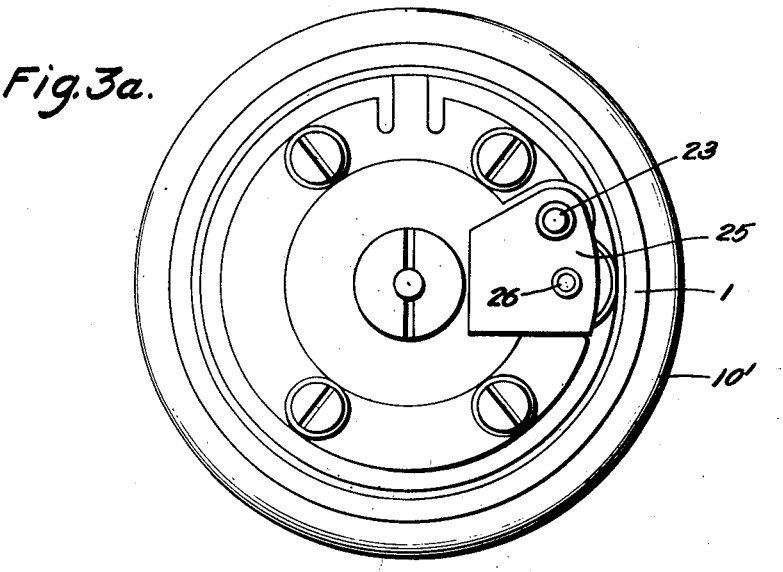

United States Patent Office 2,774,565
Patented Dec. 18, 1956

2,774,565

VALVE FOR GAS WATER HEATERS

Siegfried Klemp and Hans Dönges, Remscheid, Germany, assignors to Johann Vaillant Kommandit Gesellschaft, Remscheid, Germany Application March 13, 1951, Serial No. 215,343

6 Claims. (Cl. 251—75)

This invention relates to a fitting for a gas water heater and it is an object of the invention to provide a practical and advantageous construction, arrangement and attachmet for the fitting of a gas water heater, especially of a gas-heated continuous-flow heater, which fitting contains the gas shutting-off member. In such apparatus there are, as a rule, accommodated in the fitting two independent gas shutting-off members, namely one manually operated main shutting-off member and one shutting-off member, the so-called water-deficiency safety device, which is controlled by a diaghragm when the water is drawn. The manually operated main shutting-off members have hitherto been constructed in the form of cocks. Shutting-off devices are also known in which a valve body is urged upon its seat by means of a screw connection. Such shutting-off devices are attended by the disadvantage that large sealing surfaces slide on one another in the opening and closing movement and, consequently, have to be lubricated.

The basis of the invention is the knowledge that all practically utilizable lubricants are attacked and removed by certain gases. This creates the problem of providing a manually operated shutting-off device in which the sealing surfaces may remain dry and therefore do not require any lubrication. According to the invention, this problem is solved by employing a shutting-off member which opens and closes by axial displacement and is adapted for movement by a control mechanism, arranged outside the gas-filled space, by means of a preferably pin or rod-shaped transmission member which extends towards the gas-filled space. This control mechanism is accessible from the outside of the heater.

Shutting-off members, which open and close by axial displacement, are, for example, generally known as disk valves. However, such valves have not been used yet as hand-operated main gas shut-off valves in gas water heaters. Such a valve does not require any lubricating means at the sealing surfaces as, for example, a cock-plug mounted in the casing. On the contrary, its sealing surface is quite dry. The passage of an element of the control mechanism, which lies outside the gas space, can easily be sealed without difficulty because the passage to be sealed is merely that of a relatively thin rod of small surface area. There are numerous possible ways of suitably constructing the control mechanism of such a shutting-off device. For example, the axial movement of the valve may be produced by a suitable crank gearing. In this connection, a so-called "snap-action" control can be readily obtained, in which a spring, which acts in the direction of the push rod, presses the crank, against stops, to both sides of its upper dead-centre position. A simple clamping lever or eccentric lever may also be arranged on the push rod of the valve body and such a "snap-action" control on crossing the upper dead center can thus be obtained. The axial movement of the valve may also be produced by arranging, outside the gas space, a rotatable controlling member which is provided with a control cam and which shifts axially a lifting element which passes through into the gas space. If the lifting element is in the form of a set screw, which is, in addition, rotatable independently of its axial displaceability this lifting element may be caused to act upon a straight transmission element and an additional adjusting movement may be imposed by rotating the lifting element.

For various reasons, it is suitable for the object in view to separate the control mechanism mechanically from the valve and to provide merely a non-positive connection between the pushing element of the control mechanism and the axially movable valve element. The said control mechanism can then be combined as a structural element with shutting-off members of various dimensions and cross-sectional areas of passage. A non-positive connection between the control mechanism and the shutting-off member has chiefly the advantage that the shutting-off member can be moved by two separately operable control mechanisms, one of which only opens and closes whilst the other renders possible a regulation of the cross-sectional area of passage within adjustable limits when the shutting-off member is open.

In addition to such a main shutting-off member of switch-like form, there is also, as stated above, a second gas valve which acts as a water-deficiency safety device and which is to be operated, likewise in axial direction, by a diaphragm control mechanism in known manner. Consequently, two valve parts adapted for opening and closing movement in axial direction are to be accommodated in one gas fitting of the gas water heater. According to the invention, this is accomplished in a manner whereby that one will be operated vertically and the other horizontally and the transmission members cross each other. By means of such an arrangement there is obtained a fitting which is compact and easily fitted. The water-deficiency safety device is usually built in to have a vertical direction of operation. Now, the arrangement may be such that, in the space between the diaphragm control mechanism and the gas valve located above it, there are provided on both sides horizontal connecting pipes, one of which serves for connecting the fitting to the gas pipe and for receiving a gas valve which is to be operated horizontally and the other serves for receiving a mechanical control mechanism which controls the gas valve. In this case, the transmission linkage of one valve assembly may embrace the linkage of the other like a fork. If a connection of the same size is provided for a number of gas valves of different cross-sectional areas of passage, this connection can be inserted as required in the connecting pipes of the same fittings, and the fitting can thus be adapted for different types of apparatus.

In the case of such an arrangement, the controller which operates the main shutting-off member is inserted, as a self-contained structural part, in a forwardly directed connecting pipe of the substantially cross-shaped fitting and is secured with a cap nut. In order to be able to operate this controller manually, the front wall of the apparatus is formed with an opening through which the operating element passes and is thus accessible from the outside. This opening is unsightly and may, apart from the other disadvantages such as soiling of the arrangement, spoil the entire outward appearance. According to the invention, in order to obviate this disadvantage, there is provided an arrangement such that the passage opening in the front wall of the apparatus is closed on the inside by a bowl-shaped pulling or rotating part which may be made of pressed or die-cast synthetic plastic, which part is secured from accidental rotation and is fixed on the cap nut preferably by clamping or stop means. In this way, there are obtained, at the same time, with simple means, a good closure of the passage opening and a securing of the cap nut of the gas controller.

Naturally, the fitting according to the invention may be connected to the gas pipe as well as to the water pipe. On connecting the fitting to these pipes, considerable mechanical stresses and forces may occur, for example owing to inadequate fitting of the pipe connections, and these stresses and forces have to be taken up by the fitting. It is therefore an object of the invention to relieve the fitting from such stresses and forces in order that the connection of the individual parts of the fitting should not suffer. According to the invention, this relief is obtained thereby that the parts of the fitting are, in the vicinity of the gas and water-pipe connections, supported by a special holder against each other and or against the back wall of the apparatus. The pipe connections of the parts of the fitting are secured in their position by the said holder. The forces which occur on clamping the connections and on installation are taken up by the back wall of the apparatus and kept away from the fitting.

Such a fitting and its attachment in a continuous-flow heater are to be more fully described as an example of embodiment of the invention, reference being made to the accompanying drawings, in which Fig. 1 shows a continuous-flow heater with the fitting according to the invention, in sectional elevation;

Fig. 2 is a front elevation of the gas controller; and

Fig. 3 is a horizontal section through the gas controller on an enlarged scale, taken in the plane of line A—A in Fig. 2;

Fig. 3a shows the underside of the gas controller;

Fig. 4 is a vertical sectional view through the gas controller taken in the plane B—B in Fig. 2, shown in the lower half in the intermediate position of the control lever and in the upper half in the closing position of the latter.

Figure 1:
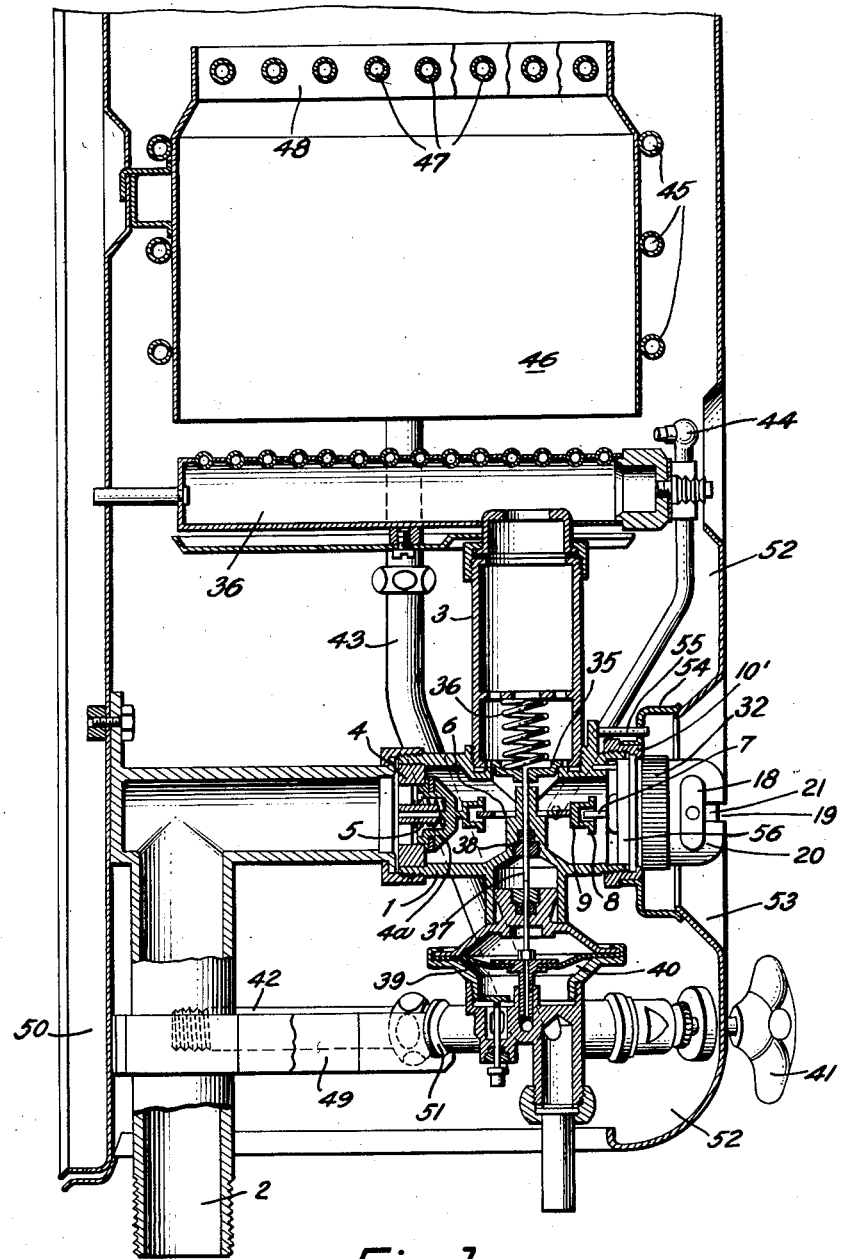
Fig. 1a is a sectional plan of a detail.

Fixed to the valve casing 1 is an elbow piece 2 which is to be connected to the gas pipe. The gas-inlet opening is closed by a valve 4, the disk 4a of which tends to lift a spring 5 from its valve-seating. The spring 5 is supported on rips 5' extending across the gas inlet. The valve disk 4a bears non-positively, with a valve rod 6, on a push rod 7 of a control mechanism Sch which will be hereinafter described. A pot-like connecting element 9, provided with a flange 8, is fitted on the front end of the valve rod 6.

Figs. 2–4 represent the control mechanism 56 which serves for the manual operation of the main gas valve 4. The controller casing 10 (Fig. 3) is inserted in a gas-tight manner in the valve casing 1 from the front and is screwed together with the valve casing 1 by means of a cap nut 10'. The push rod 7 passes through the controller casing 10 in a gas-tight guide 11. A damping cylinder 13, which is provided with a flange 12, is secured to the push rod 7 and, together with a piston 14 fixed to the controller casing, forms a damping device. Pressing on the flange 12 is a shifting spring 15 which bears against the controller casing and which is so powerful as to overcome the valve spring 5. A bail-shaped crank 17 is mounted at 16 in the controller casing 10 as shown in Fig. 4. A control lever 18, which is fixed to the crank 17, projects out of the rounded head 20 of the casing through a slot 19. Fitted to the crank 17 is a ring 21 which covers up the slot 19 in every position of the crank 17. Mounted respectively on the crank 17 on the two sides of the ring 21 are two connecting rods 22 and 22' which, at their other end, are hingedly connected with the push rod 7. The arrangement of the crank gearing (7, 17, 22) is such that, when the control lever 18 is swung through 180°, from the one end position—indicated in Fig. 3 by dash-dot lines—to the other end position the upper dead center of the crank 17 is passed.

In the controller casing 10 as shown in Figs. 2 and 3a there is fixed a guiding pin 23 on which is guided a stop plate 25 which is provided with a female screwthread 24. This screw-thread 24 runs on the end of a screw-thread 26 of an adjusting spindle 27 which passes through a gas-tight guide 28 in the controller casing 10. A helical spring 29, which, at one end, bears on the controller casing 10 and, at the other end, bears on the stop plate 25, tends to press the latter, together with the adjusting spindle 27, upwards. A collar 30, which is fitted on the adjusting spindle 27, bears, under the influence of the spring 29, non-positively on a control cam 31. The latter is situated on the inside of an adjusting ring 32 which is rotatably mounted on the controller casing 10. The stop plate 25 is arranged in such a manner that the flange 8 on the head 9 of the valve rod can strike it.

The operation of the arrangement described is as follows:

With the control lever 18 in the position represented in Figs. 2 and 3, the valve 4 is kept closed by the push rod 7 and spring 15. The shifting spring 15 then presses the control lever 18, through the crank gearing 22, 17, resiliently against its end stop in the slot 19. If the control lever 18 is swung through 180° into the position shown in broken lines, it is, when in this position, also pressed by the spring 15 against the stop in the slot 19, since the crank 17 is now located on the other side of its upper dead center (snap-action control). The push rod 7 has then been pulled away by the crank gearing 17, 22, so that the valve rod 6 can follow and the valve spring 5 can open the valve 4. However, the flange 8 on the head 9 of the valve rod is stopped on the stop plate 25, so that the valve 4 cannot open completely but only to the extent permitted by the position of the stop plate 25. By rotating the adjusting spindle 27 at its end 33 which is provided with a screwing slit 33, the stop plate 25 can be displaced and the desired maximum passage opening of the valve 4 can thus be adjusted. The spring 29 is, as well as the spring 15 stronger than the valve spring 5, so that the latter is also overcome on displacement of the stop plate 25. It would thus be possible, in gas water heaters, to adjust the desired water temperature with the screw spindle 27. If the adjusting ring 32 is now rotated, the stop plate 25 is, together with the spindle 27, displaced by the spring 29 to an extent corresponding to the position of the cam 31, the stop plate 25 taking the valve rod 6 with it whilst overcoming the valve spring 5. The valve 4 can therefore be closed to a greater or smaller extent by rotating the adjusting ring 32, without a change being made in the initial adjustment effected by the adjusting spindle 27. The adjusting ring 32 therefore also, when the control lever 18 is set to the "open" position, allows any desired lower temperature, for example for shower baths, to be adjusted.

If the control lever 18 is placed in the "shut-off" position, a too violent snapping over, which might be effected under the influence of the shifting spring 15, is prevented by the damping device 13, 14. The control mechanism accommodated in the casing 10 forms a closed structural part termed a "control lock" which can be combined, constructed in the same way, with valves of other dimensions. For the main valve may be easily replaced by another similar valve having a larger or smaller cross-sectional area so as to render it possible to use the same fitting with the hereinbefore described "control lock" for gas water heaters of lesser or greater capacity.

The valve casing 1, in which are accommodated, on the one hand, the disk valve 4 and, on the other hand, the control lock described carries an upwardly extending connecting pipe 3 to which the gas burner 34 is connected. The discharge of gas from the valve casing 1 to the connecting pipe 3 takes place through a further plate valve 35 which is closed by the pressure of a valve spring 36. A valve rod 37 of the plate valve 35, which rod crosses the valve rod 6, is led, through a stuffing box 38, to the diaphragm 39 of a water regulator 40. The valve rod 6 embraces, in a fork-like manner, the stuffing box 38 and the valve rod 37 sliding therein, as represented separately in Fig. 1a. The water deficiency safety device used herein, which is not the subject matter of the instant invention, is of the kind described in the copending U. S. application filed March 13, 1951, Serial No. 215,341, now abandoned, of Hans Dönges for improvements in gas water heaters.

As soon as, after opening the tap cock 41, water flows through the water regulator connected in the water pipes 42 and 43, the diaphragm 39 is raised by the water pressure prevailing beneath it, and the valve 35 is, with the aid of the valve rod 37, opened against the pressure of the valve spring 36. It is only when the two valves, the valve 4 which is operated by the control lock and the valve 35 which is controlled by the water regulator 40, are opened that the burner 34 receives gas which is then lit by the pilot flame 44. The water flowing in the pipe 43 flows, in tubes 45, round the heating shaft 46 which is closed at the top by a tinned heating element 48 through which pass water tubes 47. The water is thus heated in continuous flow in the known manner.

Figure 1A:
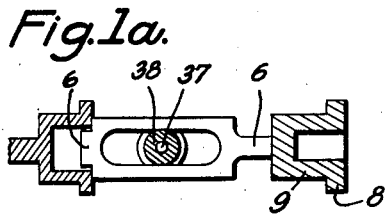

The substantially cross-shaped fitting, which consists of the valve casing 1, the connecting pipe 3 and the attached water regulator, must be connected, on the one hand, to the gas-supply pipe by means of the elbow piece 2 and, on the other hand, to the water-supply pipe 42. In order that no mechanical stresses should occur on fitting the apparatus between the parts of the fitting described owing to inaccurately fitting tube connections, there is provided a holder 49 which, on the one hand, rests against the back wall 50 of the apparatus and, on the other hand, surrounds the gas and water connecting pipes 2 and 51 and fixes their mutual positions as shown in Fig. 1.

The whole apparatus is closed on the outside by a jacket 52 which has a stamped opening 53 through which the control mechanism 56 is accessible from the outside. Mounted on the cap nut 10' of the control mechanism 56 is a pot-shaped part 54 which closes the opening 53 from the inside. The pot-shaped part 54 is secured against rotation by a pin 55 passing through it and fixed to the valve casing 1 and is fixed on the cap nut 10' by clamping or stop means as shown in Fig. 2. The cap nut 10' is thus also prevented from becoming loose.

What we claim is:

1. A fitting for gas water heaters, comprising a valve casing having a passage through it, a valve adapted to shut off the passage and provided with a control member, said valve opening and closing by the movement of said control member, a hand operated control mechanism comprising a gear housing which is fastened to said valve casing, a bail shaped crank pivoted in said gear housing and provided with a control lever extending through a slot provided in said gear housing and being rotatable in this slot about an angle of approx. 180° between an "open" and a "closed" position, a ring covering said slot and fastened at said bail shaped crank, connecting rods pivoted at the two sides of said ring, a push rod that can be axially displaced and extending into the valve casing, said connecting rods hinge connected with said push rod, said control member of said valve connected for movement with said push rod.

2. A fitting according to claim 1, comprising a shifting spring which acts on said crank in the direction of the movement of said push rod, and said crank passes on its operating path its top dead center.

3. A fitting for gas water heaters, comprising a valve casing having a passage through it, a valve adapted to shut off the passage and provided with a control member, said valve opening and closing by the movement of said control member, a hand operated control mechanism comprising a gear housing which is fastened to said valve casing, a bail shaped crank pivoted in said gear housing and provided with a control lever extending through a slot provided in said gear housing and being rotatable in this slot through an angle of approximately 180° between an "open" and a "closed" position, a ring covering said slot and fastened at said bail shaped crank, connecting rods pivoted at the two sides of said ring, a push rod that can be axially displaced and extending into the valve casing, said connecting rods hinge connected with said push rod, said push rod extending into the path of said control member, elastic means connected with said valve, said elastic means tending to keep said valve in "open" position and to force said control member non-positively against said push rod, a second hand operated control mechanism disposed outside of said valve casing comprising a ring shaped control element that may be turned and which is provided with a cam, a stop element, said stop element movable in axial direction and extending into said valve casing and also extending into the path of said control member of said valve, sealing means for said stop element, said stop element being in contact with said cam and each according to the position of the cam extending more or less into the valve casing, the dimensions being so selected that at least at certain positions of the cam said stop element extends more into the path of said control member than said push rod at opening position of the first control mechanism and thus forming a stop for the control member of said valve, so that only an "on-off" movement is effected by the first control mechanism, while the diameter of the valve passage during opening position is determined by the second control mechanism.

4. A fitting according to claim 3, comprising a shifting spring which acts on said crank in the direction of the movement of said push rod, and said crank passes on its operating path its top dead center.

5. A fitting according to claim 1, wherein a damping device comprising a damping cylinder and piston is connected with said crank gearing push rod.

6. A fitting according to claim 3, wherein said annular control element encircles said gear housing of said first control mechanism.

References Cited in the file of this patent

UNITED STATES PATENTS

| | | |
|---|---|---|
| 556,641 | Porcher et al. | Mar. 17, 1896 |
| 654,602 | Bunting | July 31, 1900 |
| 674,289 | Wescott et al. | May 14, 1901 |
| 762,249 | Ott | June 7, 1904 |
| 859,371 | Coyle | July 9, 1907 |
| 1,055,152 | Erickson | Mar. 4, 1913 |
| 1,066,891 | Erskine | July 8, 1913 |
| 1,255,835 | Shaug | Feb. 5, 1918 |
| 1,309,083 | Wright | July 8, 1919 |
| 1,506,834 | Hook | Sept. 2, 1924 |
| 1,552,100 | Waters | Sept. 1, 1925 |
| 1,603,005 | Flam | Oct. 12, 1926 |
| 1,730,455 | Glauber | Oct. 8, 1929 |
| 1,856,845 | Donahue | May 3, 1932 |
| 2,088,174 | Paullin | July 27, 1937 |
| 2,094,288 | Zinkil et al. | Sept. 28, 1937 |
| 2,145,305 | Hull | Jan. 31, 1939 |
| 2,270,365 | Wilson | Jan. 20, 1942 |
| 2,337,659 | Hughey et al. | Dec. 28, 1943 |
| 2,634,758 | Ojalvo | Apr. 14, 1953 |

FOREIGN PATENTS

| | | |
|---|---|---|
| 468,343 | France | Apr. 22, 1914 |
| 505,717 | Germany | Aug. 23, 1930 |